US006430261B1

(12) United States Patent
Bathe

(10) Patent No.: US 6,430,261 B1
(45) Date of Patent: Aug. 6, 2002

(54) ROTARY ANODE X-RAY TUBE WITH AN AXIAL BEARING ARRANGEMENT

(75) Inventor: Christoph Bathe, Hamburg (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 09/610,596

(22) Filed: Jul. 5, 2000

(30) Foreign Application Priority Data

Jul. 7, 1999 (DE) .......................................... 199 31 296

(51) Int. Cl.[7] ................................................ H01J 35/10
(52) U.S. Cl. ........................................ 378/132; 378/144
(58) Field of Search ................................ 378/132, 144, 378/143, 131

(56) References Cited

U.S. PATENT DOCUMENTS

| 4,081,707 A | * | 3/1978 | Hartl et al. ..................... 313/60 |
| 4,346,946 A | * | 8/1982 | Maruyama ....................... 308/9 |
| 4,677,651 A | * | 6/1987 | Hartl et al. .................... 378/132 |
| 4,780,900 A | * | 10/1988 | Gabbay et al. ................ 378/132 |
| 5,357,552 A | * | 10/1994 | Kutschera .................... 378/132 |
| 5,495,221 A | * | 2/1996 | Post ............................. 335/299 |
| 5,548,629 A | * | 8/1996 | Kimura et al. ................ 378/134 |
| 5,701,336 A | * | 12/1997 | Jacob ........................... 378/132 |
| 5,847,480 A | * | 12/1998 | Post ............................ 310/90.5 |
| 6,203,895 B1 | * | 3/2001 | Berger et al. ................. 428/325 |

FOREIGN PATENT DOCUMENTS

DE          3017291 A1 * 11/1980       ............ H01J/35/10

* cited by examiner

*Primary Examiner*—Robert H. Kim
*Assistant Examiner*—Irakli Kiknadze
(74) *Attorney, Agent, or Firm*—John Vodopia

(57) ABSTRACT

The invention relates to a rotary-anode X-ray tube which includes an axial bearing arrangement which is particularly suitable for combination with a radial spiral groove bearing. It is a problem of known axial magnet bearings, which generally comprise two tooth-like structures which are oriented in the radial direction and are oppositely situated, consists in that substantial radial forces are generated during the starting and the stopping phase, which radial forces can cause substantial wear of notably radial spiral groove bearings. An axial bearing which involves significantly lower radial forces and hence a less loading of the radial bearings, is realized by an arrangement of at least two magnetic elements which are spaced apart in the axial direction and are connected in such a manner that they take up axial bearing forces. A further solution to this problem is achieved by means of an axial bearing in the form of a single-point ball bearing.

9 Claims, 3 Drawing Sheets

ROTARY ANODE X-RAY TUBE WITH AN AXIAL BEARING ARRANGEMENT

BACKGROUND OF THE INVENTION

The invention relates to a rotary anode X-ray tube with an axial bearing arrangement which is particularly suitable for combination with radial spiral groove bearings.

An X-ray tube of this kind is known, for example from DE 30 17 291 and includes an anode (rotary anode) which is arranged so as to be rotatable within a vacuum tube and is connected to a motor rotor which is driven by a motor stator situated outside the tube. The anode is journalled radially by means of two spiral groove bearings and axially by means of two tooth-like structures of a magnetizable metal (iron) which are fixed to the rotary anode and a stationary part of the housing, respectively, the axial force effect being produced by cooperation of the teeth of the two structures which extend in the radial direction and are situated opposite one another. When the teeth are oriented so as to be situated exactly opposite one another, the axial force effect is zero. When the teeth are displaced relative to one another due to an axial motion of the rotary anode, the associated magnetic stray losses of the magnetic circuit cause an axial reset force at the area of the teeth. The magnet system thus constitutes a self-adjusting axial bearing with a stable zero point.

This magnet arrangement, however, has the drawback that at the same time, there are produced radial forces which are not self-adjusting and are even intensified outside the concentric central position of the anode. Such radial forces may lead to a high load and wear of the radial bearings notably when the rotary anode is switched on and off. This is notably so when spiral groove bearings are used as the radial bearings, because their bearing force is hardly existent yet at low speeds.

OBJECTS AND SUMMARY OF THE INVENTION

Therefore, it is an essential object of the invention to provide a rotary-anode X-ray tube with an axial bearing arrangement wherein the radial forces of the axial bearing are significantly smaller and which is particularly suitable for combination with radial spiral groove bearings.

This object is achieved in a first way by means of a rotary-anode X-ray tube of the kind set forth which is characterized in that the axial bearing arrangement includes a magnet arrangement with at least two elements which exert a magnetic force on one another, are spaced apart in the axial direction of the rotary anode and are connected in such a manner that the magnetic force takes up axial bearing forces in at least one direction.

As a result of the elements which are spaced apart in the axial direction of the rotary anode, said radial forces are substantially zero so that the loading of the radial bearing is significantly less.

It is an advantage of this solution that the magnet arrangement according to the invention has a construction which is significantly simpler and hence less expensive than the previously described tooth-like magnet structures. Moreover, in comparison with these magnet structures a significant amount of weight is saved, so that the loading of the radial bearings and their wear, notably during the starting and stopping phase, is proportionally less. Finally, the diameter of a rotary-anode bearing element or a bearing bush may be significantly larger, thus enabling the formation therein of one or more bores for cooling the anode by means of a cooling liquid.

A second way of achieving the above object involves a rotary-anode X-ray tube of the kind set forth which is characterized in that the axial bearing arrangement includes an end-face single-point ball bearing with a ball which lies in a cone and bears on a plate which acts as an abutment.

The dependent Claims relate to attractive further embodiments of the invention.

Another embodiment of the present invention offers the advantage that forces acting in both axial directions are taken up, so that the rotary anode can occupy a stable and force-free central position in the axial direction.

A particularly advantageous axial bearing arrangement of the present invention involves a combination of an axial magnet bearing and an axial end-face single-point ball bearing.

BRIEF DESCRIPTION OF THE DRAWINGS

Further details, features and advantages of the invention will become apparent from the following description of preferred embodiments which is given with reference to the drawing. Therein.

Figure 1:
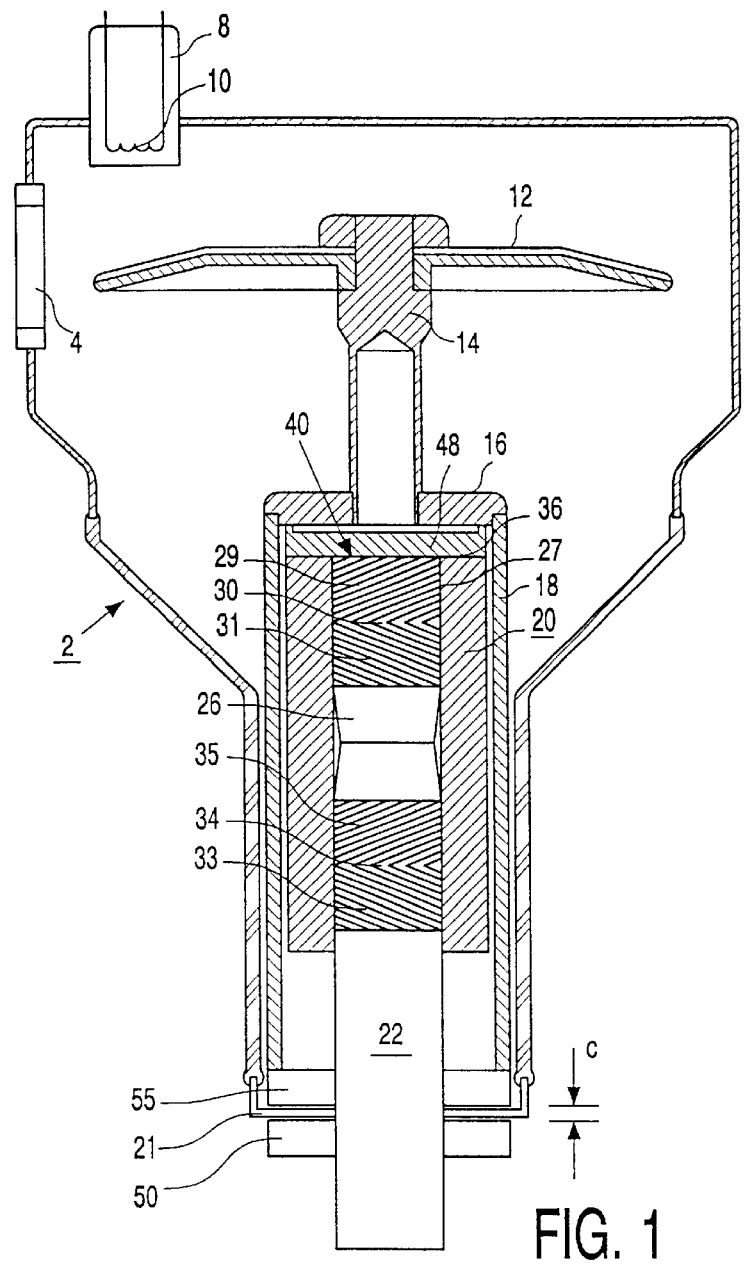
FIG. 1 is a longitudinal sectional view of a first embodiment of the invention.

A rotary-anode X-ray tube as shown in FIG. 1 includes a tube 2 with a radiation exit window 4 and a cathode arrangement 8 with a filament 10. Opposite the cathode arrangement there is situated an anode disc 12 which is mounted on an anode shaft 14. A cylindrical rotor 18 and an end plate 48 with a bearing bush 20 are also connected to the anode shaft 14 by means of a mounting ring 16.

On the surface 27 of a cylindrical bearing element 22, being located in the axial and in the radial direction in the bearing bush 20, there is provided a first spiral groove bearing with a first, fishbone-like pattern 30 of helically extending grooves in the form of two groove patterns 29 and 31 which extend in opposite directions. The cylindrical bearing element 22 is also provided with an intermediate zone 26 without grooves as well as with a second fishbone-like pattern 34 of helically extending grooves which is formed by two groove patterns 33 and 35 which are also oppositely directed. The first two spiral groove bearings 30, 34 serve as a radial bearing arrangement for the rotary anode.

Figure 2:
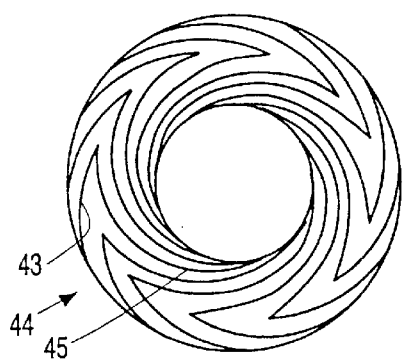
FIG. 2 is a plan view of an axial bearing arrangement.

On the upper end face 36 (in the Figure) of the bearing element 22 there is provided a first axial bearing arrangement in the form of a second spiral groove bearing 40 with helically extending grooves 43, 45 in conformity with FIG. 2. They form a first and a second groove pattern, respectively, in which the grooves are oppositely directed, like in the first spiral groove pattern, thus forming a fishbone-like pattern 44.

A second axial bearing arrangement is formed by a magnet arrangement which is provided at the lower end of the tube 2 in the Figure. This bearing arrangement includes two elements which are coaxially arranged relative to the rotary anode shaft, that is, a first annular magnet 50 which is secured to the bearing element 22 in the axial direction, serves as an abutment, and is arranged underneath the bottom 21 of the tube 2. Opposite this abutment, within the tube and directly above the bottom 21 there is provided an annular element 55 of iron or another magnetizable material which is secured to the cylindrical rotor 18 and hence to the rotary anode in the axial direction. Between the magnet 50 and the iron element 55 there is formed an air gap c via which the magnet exerts an attractive force on the iron element. Thus, an oppositely directed axial bearing force is taken up and the first axial bearing arrangement (upper end-face spiral groove bearing) is biased. Instead of the iron element 55, of course, a second annular magnet could be used.

The arrangement of the first magnet 50 outside the tube offers the advantage, notably in the case involving a permanent magnet which is generally sensitive to temperature, that it can be mounted after assembly of the tube and completion of the associated heating processes. It is also possible to use an electromagnet instead of a permanent magnet.

Figure 3:
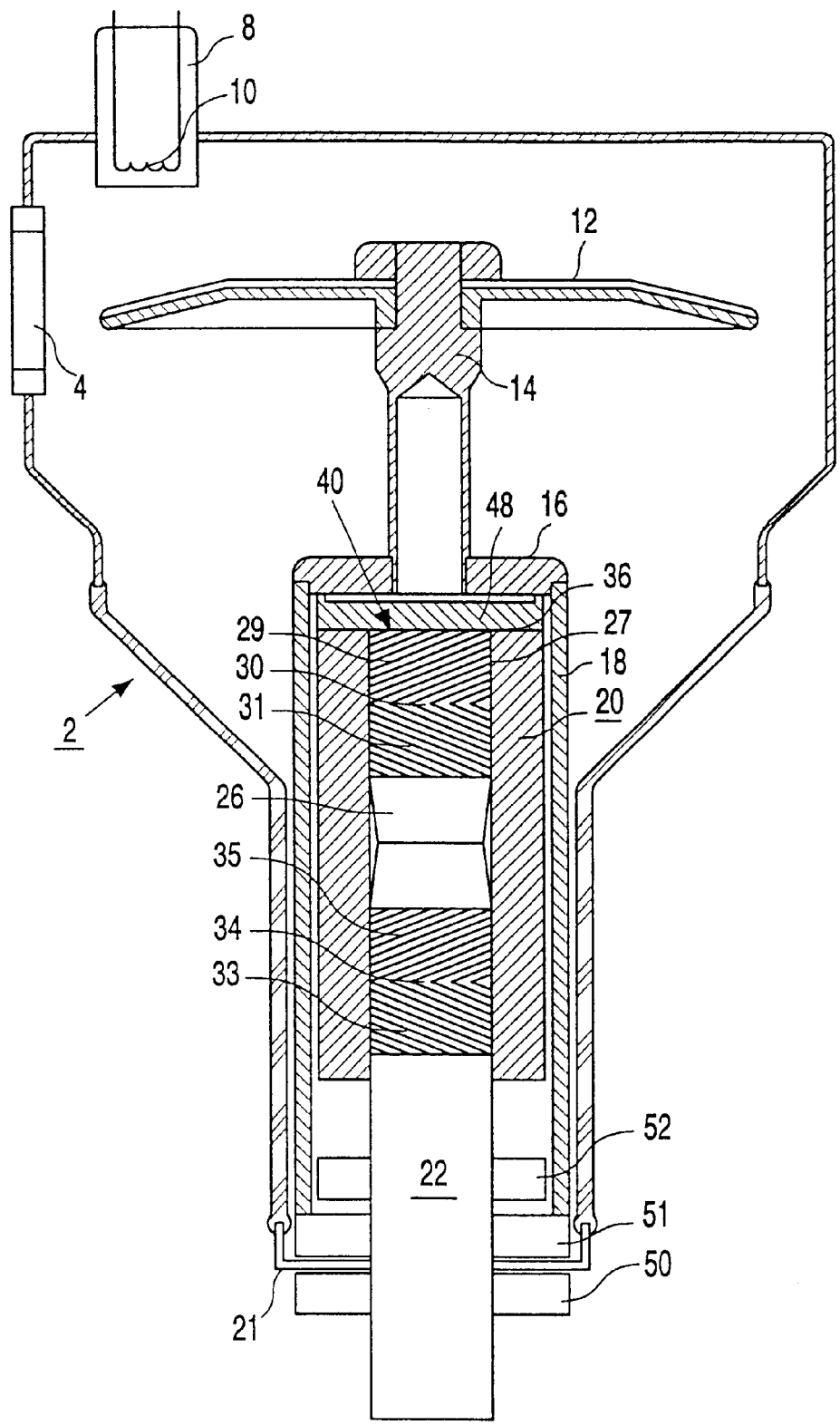
FIG. 3 is a longitudinal sectional view of a second embodiment of the invention.

FIG. 3 shows a second embodiment of the invention in which the first axial bearing arrangement (upper end-face spiral groove bearing) is the same as in the first embodiment.

The second axial bearing arrangement is formed by a magnet arrangement with three annular magnets 50, 51, 52. The first magnet 50 is attached again to the bearing element 22 whereas the second magnet 51 is attached to the cylindrical rotor 18 and the third magnet 52 is mounted on the bearing element 22. The magnets are arranged in such a manner that each time similar poles are situated opposite one another. Consequently, the magnet arrangement is capable of taking up axial bearing forces in both directions, so that the rotary anode occupies a stable, axial central position.

In order to simplify assembly, the annular elements 50, 55; 51, 52 may be composed of each time two half-rings or a plurality of individual elements which are arranged in the form of a ring.

At least the second magnet 51 in the second embodiment is situated within the tube 2 and hence within the vacuum. Therefore, this magnet is subjected to all heating processes whereto the tube is subjected. Thus, there is a risk of demagnetization in the case of temperature sensitive permanent magnets.

This problem can be counteracted in two ways. On the one hand, rare earth magnets are known which are capable of withstanding temperatures of up to approximately 350° C. without being demagnetized. On the other hand, a magnetic material having lost its magnetic force due to excessively high temperatures can be remagnetized again by means of a magnetization operation performed outside the tube.

Figure 4:
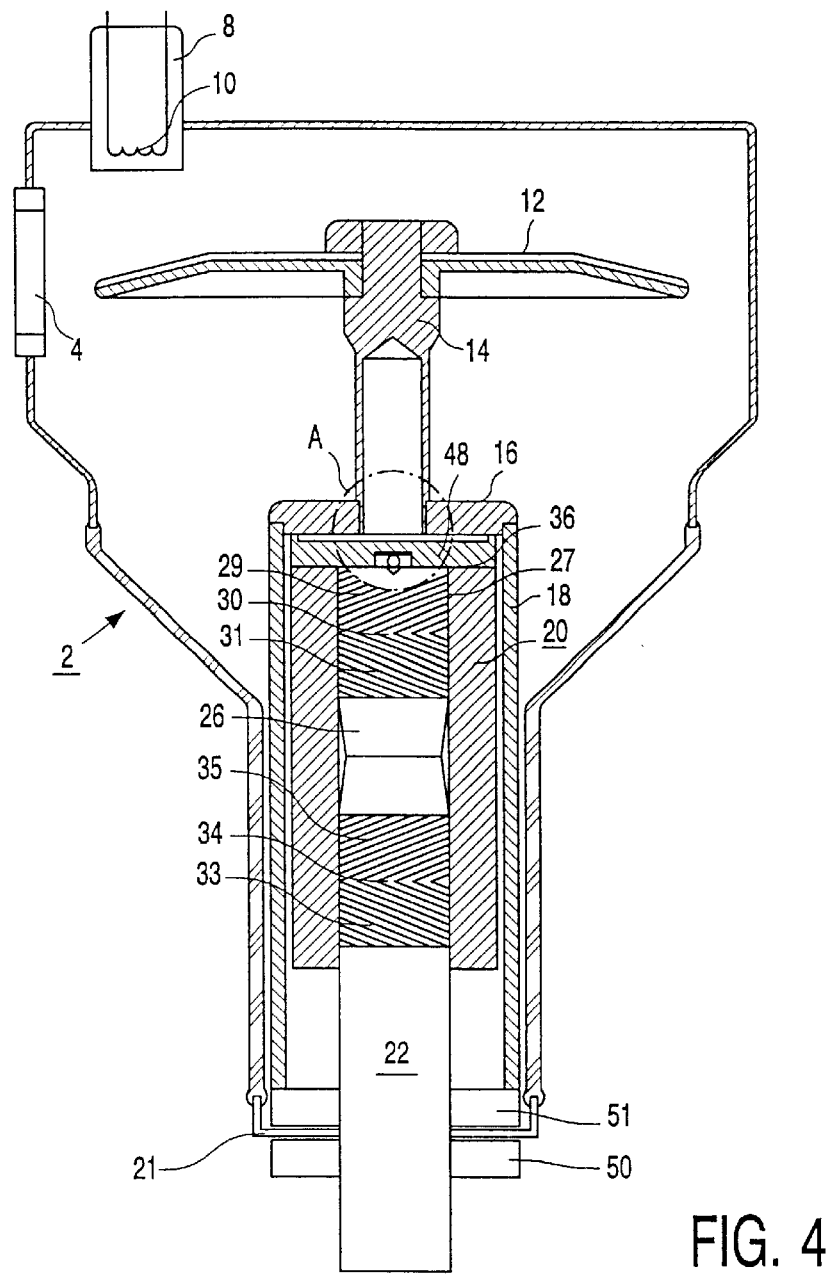
FIG. 4 is a longitudinal sectional view of a third embodiment of the invention.

FIG. 4 shows a third embodiment of the invention which concerns first of all the (upper) axial bearing arrangement, in this case combined with the second axial bearing arrangement in the form of the first magnet 50 and the iron element 55 (in conformity with the first embodiment). Alternatively, the second axial bearing arrangement could also be constructed in conformity with the second embodiment.

DESCRIPTION OF THE PREFERRED EMBODIMENTS

Figure 5:
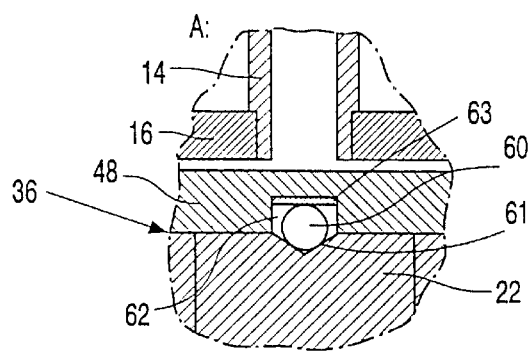
FIG. 5 is a detailed representation of a part of FIG. 4.

The first axial bearing arrangement in the embodiment shown in FIG. 4 is formed by an end-face single-point ball bearing as shown in detail in FIG. 5. This bearing includes a ball 60 which bears in a cone 61 in the end face 36 of the bearing element 22. The oppositely situated end plate 48 is provided with a recess 62, at the bottom of which there is provided a plate 63 which serves as an abutment for the ball 60. The diameter of the ball 60, the depth of the recess 62 and the shape of the cone 61 are attuned to one another in such a manner that a gap which prevents wear remains between the end face 36 of the bearing element 22 and the end plate 48.

The operation of this axial bearing is based on the fact that, because of the centering of the ball 60 in the cone 61 and the associated annular bearing surface of the ball, the ball cannot rotate in the cone. The axial journalling of the rotary anode is then realized via the point of contact between the ball 60 and the plate 63, so that the noise and wear of this bearing arrangement are particularly low. The combination with an axial magnet bearing arrangement again offers the advantage that aim adjustment of the rotor 18, necessary when an axial spiral groove bearing is used instead of the magnet bearing, need not necessarily be carried out.

In order to prolong the service life, the ball 60 and the plate 63 are made of wear-resistant material combinations. To this end, for example, tungsten carbide (WC), silicon carbide (SiC), silicon nitride ($Si_3N_4$) or borium nitride (BN) can be used; the ball and the plate can also be provided with a coating of, for example titanium carbide (TiC) or titanium nitride (TiN).

A further reduction of wear can be achieved by providing, in the gap between the bearing element 22 and the end plate 48, a lubricant in the form of, for example, the material used for the axial first spiral groove bearing, for example, a liquid metal.

The first spiral groove bearing 30, 34 described with reference to FIG. 1 can be used as the radial bearing in all embodiments.

The above three embodiments of the axial bearing arrangement were described for the case where the anode shaft 14 is connected, via the mounting ring 16, to the cylindrical rotor 18, the end plate 48 and the bearing bush 20, so that all these parts rotate whereas the bearing element 22 is stationary. As an alternative it is also possible for the anode disc 12 and the anode shaft 14, whereto the cylindrical rotor 18 is connected by means of the mounting ring 16, to be connected directly to the bearing element 22 whereas the bearing bush 20 is stationary on the bottom of the tube 2. In this case the anode shaft 14 rotates in the bearing bush 20 together with the bearing element 22. In this case the bearing element 22 is axially journalled in the bearing bush 20 by way of its lower (free) end face (in this rendition). This axial bearing represents the first axial bearing arrangement (end-face spiral groove bearing according to FIG. 2 or end-face single-point ball bearing in conformity with FIG. 5), whereas the second axial bearing arrangement may be formed by the magnet arrangement 50, 55 in conformity with FIG. 1 or the magnet arrangement 50, 51, 52 in conformity with FIG. 3.

What is claimed is:

1. A rotary-anode X-ray tube, comprising:

a tube with a cathode arrangement;

an anode shaft;

a rotary anode mounted on the anode shaft; and a cylindrical rotor mounted on the anode shaft including an end plate with a bearing bush;

wherein an axial bearing arrangement including a magnet arrangement includes a first and second magnet element arranged where the first magnet element is secured to the bearing element in an axial direction outside of and underneath the tube, and the second magnet element is positioned inside the tube opposite the first element and secured to the anode shaft such that the first and second magnet elements are spaced apart in an axial direction of said rotary anode and exert a magnetic force on one another such that the magnetic force takes up axial bearing forces in at least one direction.

2. The rotary-anode X-ray tube as claimed in claim 1, wherein a first element of said at least two elements is a magnet ring and a second element of said at least two elements is a ring of a magnetizable metal, said first element and said second element being arranged coaxially about said rotary anode, one element of said first element and said second element being fixed as an abutment whereas the other element of said first element and said second element is fixed to the rotary anode in the axial direction.

3. The rotary-anode X-ray tube as claimed in claim 1, wherein said at least two elements includes a first magnet, a second magnet, and a third magnet all oriented in such a manner that each time similar poles of said first magnet, said second magnet, and said third magnet are situated opposite one another, said first magnet and said third magnet are fixed as an abutment whereas said second magnet is fixed to said rotary anode in the axial direction.

4. The rotary-anode X-ray tube as claimed in claim 1, wherein said at least one of the elements is an electromagnet.

5. The rotary-anode X-ray tube as claimed in claim 1, wherein said axial bearing arrangement further includes an end-face spiral groove bearing.

6. The rotary-anode X-ray tube as claimed in claim 1, wherein said axial bearing arrangement further includes a radial spiral groove bearing.

7. The rotary-anode X-ray tube as claimed in claim 1, wherein said axial bearing arrangement further includes an end-face single-point ball bearing with a ball which is situated in a cone and bears on a plate which acts as an abutment.

8. The rotary-anode X-ray tube as claimed in claim 7, wherein said ball or said plate is made of tungsten carbide, silicon carbide, silicon nitride or borium nitride.

9. The rotary-anode X-ray tube as claimed in claim 7, wherein said ball or said plate is provided with a coating of titanium carbide or titanium nitride.

* * * * *